United States Patent

Wagner

[15] 3,703,068

[45] Nov. 21, 1972

[54] CONTROL SYSTEM FOR SELECTIVE ADSORPTION PROCESS

[72] Inventor: John L. Wagner, Lackawanna, N.Y.

[73] Assignee: Union Carbide Corporation

[22] Filed: March 26, 1971

[21] Appl. No.: 128,591

Related U.S. Application Data

[63] Continuation-in-part of Ser. No. 659,381, Aug. 9, 1967, Pat. No. 3,418,430.

[52] U.S. Cl. ..........................55/21, 55/62, 55/163, 55/179
[51] Int. Cl. ............................................B01d 53/02
[58] Field of Search............55/18, 20, 21, 58, 62, 66, 55/68, 70, 163, 179

[56] References Cited

UNITED STATES PATENTS 3,338,030   8/1967   Feldbayer, Jr.................55/62
3,257,772   6/1966   Maddox et al.................55/20
2,561,441   7/1951   Lou..............................55/163
3,230,688   1/1966   Kitchen et al. ................55/21

*Primary Examiner*—Charles N. Hart
*Attorney*—Paul A. Rose, Thomas I. O'Brien, John C. Le Fever and Richard G. Miller

[57] ABSTRACT

A pressure swing process for selective adsorption of feed gas components is controlled by maintaining a predetermined constant ratio of relative adsorption rate to repressurization product gas flow rate, and preferably cycling the adsorbent beds in response to termination of the repressurization step.

21 Claims, 7 Drawing Figures

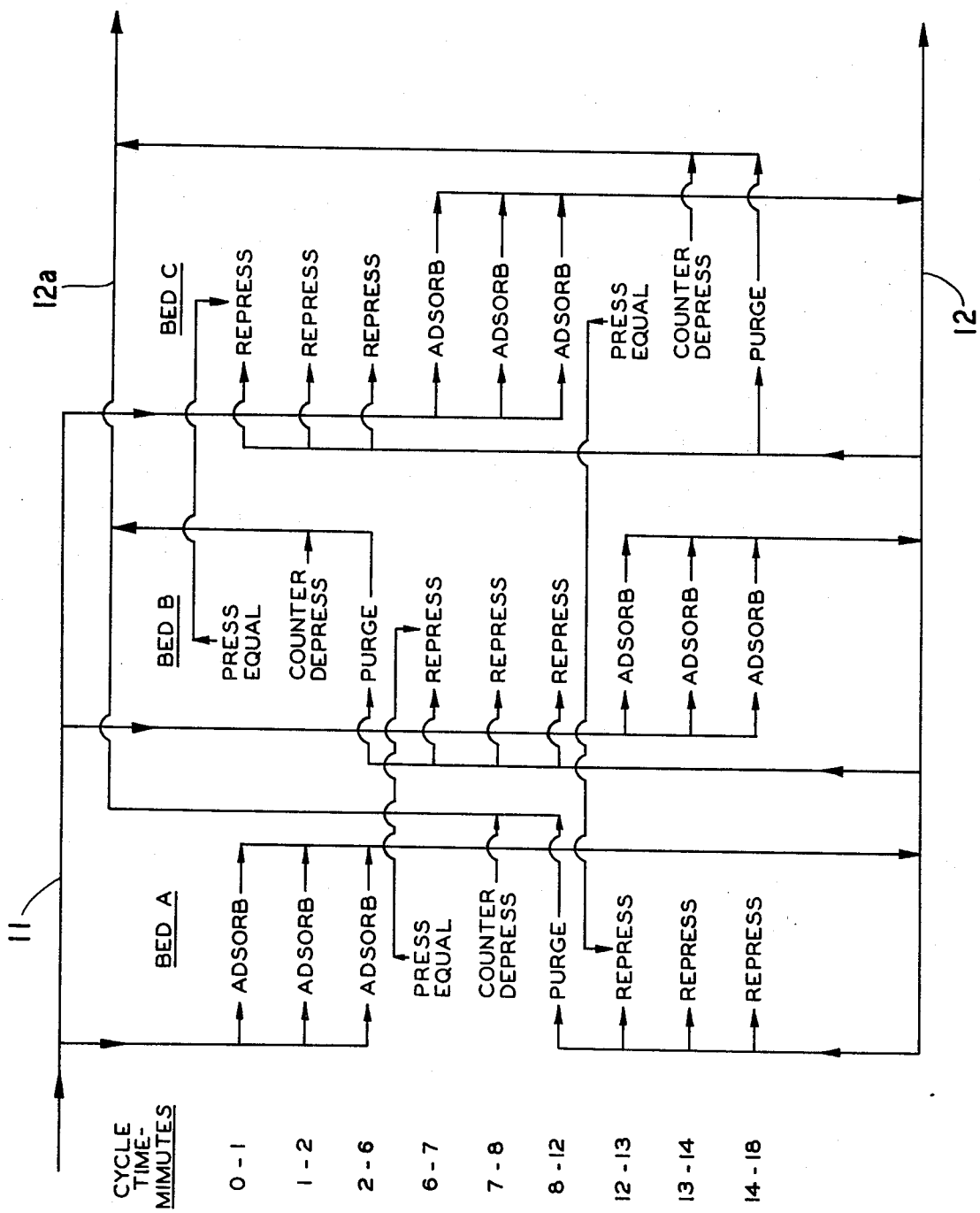

CONTROL SYSTEM FOR SELECTIVE ADSORPTION PROCESS

RELATED APPLICATION

This application is a continuation-in-part of application Ser. No. 659,381 filed Aug. 9, 1967, and now U.S. Pat. No. 3,418,430.

BACKGROUND OF THE INVENTION

This invention relates to a method for controlling a pressure swing selective adsorption process for separating at least one component from feed gas mixture in several adsorbent beds.

Pressure swing adsorption processes are well known for separating gas mixtures by selective adsorption of at least one component at a first higher pressure and desorption by depressurization to a second lower pressure. In may instances desorption is aided by purging, usually at the lower pressure and often with a portion of the unadsorbed product gas as the purging fluid. Desorption may also be accelerated by heating the adsorbent, either by embedded coils or indirectly by means of a purge gas warmed above the temperature of the adsorption step. In some systems desorption may be accomplished simply by pressure reduction and without heating. These latter systems are substantially adiabatic and are generally preferred by the art because of their simplicity.

The common method of operating a rapid cycle adsorption process is to control all cycle steps with a programmed cam timer. Each cycle step is alloted a predetermined period of time, hence, this type of cycle control is commonly called "fixed cycle" control. Typically an electric timer with multiple cams is used and each switching valve is controlled by the cam switches.

The disadvantages of "fixed cycle" control are inherent in the aforementioned procedure of allotting a fixed predetermined period of time for each cycle step. At the end of that time period, the step is terminated regardless of whether it is completed or not. As a result, certain undesirable situations may develop. For example, if the flow rate of gas for repressurizing the adsorber from the lower desorption pressure to the higher adsorption pressure is too low, the adsorber will be switched to the adsorption step before it is completely pressurized. The result is a severe product flow or pressure upset and possible severe attrition of the adsorbent. Similarly, if the repressurization flow rate is too high, the adsorber will be repressurized before it is switched to the adsorption step. The result is a severe product flow upset because the repressurization flow has stopped. That is, no product gas is diverted for repressurization during this period and the product discharge rate from the process increases sharply.

Another disadvantage of "fixed cycle" control is that cycle time is independent of feed flow rate. At low feed flow rates the adsorbent capacity is not fully utilized and high product losses are incurred due to more frequent depressurization than necessary. At high feed flow rates the impurities will break through prior to the end of the adsorption step and impure product is discharged. As used herein, the expression "break through" refers to the point in an adsorption step where the concentration of adsorbate significantly increases in the non-adsorbed product gas discharged from the adsorbent bed.

It is an object of this invention to provide a control method for a pressure swing adsorption process which avoids severe product flow or pressure upsets.

Another object is to provide a control method permitting full utilization of the adsorbent capacity under varying feed flow rates.

Still another object is to provide a control method affording high purity and high recovery of separated product under varying feed flow rates.

A further object of this invention is to provide a control method which is self-adjusting to changes in the relative adsorption rate in the system so as to avoid flow and pressure fluctuations in the withdrawn product, and to afford high purity and high recovery of separated product, and high utilization of adsorbent capacity, all without special containers for product hold-up in the system.

Other objects and advantages of this invention will be apparent from the ensuing disclosure and appended claims.

SUMMARY

The method aspect of this control system relates to a pressure swing adsorption process for continuously separating feed gas mixture in at least three adsorbent beds. This process includes the repeating cycle steps of sequentially contacting the feed gas mixture with each bed at first higher pressure for selective adsorption of at least one component and discharge of one-component depleted product gas, desorption by depressurization of the bed to second lower pressure, and at least partial repressurization of the desorbed bed by the product gas followed by recontact with the feed gas mixture.

The improved control method for this process requires sensing the relative adsorption rate of a first adsorbent bed during the selective adsorption step. As used herein the expression "relative adsorption rate" is the rate at which the equilibrium capacity of a particular adsorbent bed for a particular adsorbable material or materials is approached. One variable affecting relative adsorption rate is gas load rate - the rate of gas flow through the bed contacted by the feed gas mixture. The feed gas flow rate itself may be sensed or alternatively the unadsorbed product gas flow rate discharged from the "on-stream" bed may be sensed. Obviously the latter will be lower than the feed gas by the margin of adsorption rate but either provides a measure of the gas load rate on the adsorbent. For example, if the feed gas flow rate increases and its composition remains constant, the relative adsorption rate also increases. Another variable affecting the relative adsorption rate is the feed gas composition; a higher content of adsorbables increases this rate. Still another variable is feed gas temperature. Since the capacity of all adsorbents decreases with increasing temperature, the relative adsorption rate also increases under these circumstances if the gas load rate is constant. Conversely, higher pressure increases the adsorbent capacity and therefore an increase in pressure will tend to reduce the relative adsorption rate. The proximity to which a given adsorbent approaches its theoretical equilibrium capacity is termed activity. With other factors constant, increasing the activity of the adsorbent results in a lower relative adsorption rate. It is contemplated that more than one of the aforementioned variables may change simultaneously, and the control method may require multiple sensing to establish the relative adsorption rate.

Simultaneously and continuously with the relative adsorption rate sensing, a portion of the product gas discharged from the first adsorbent bed is diverted for return to the process and the undiverted product gas is discharged from the process. At least part of the diverted portion is used as repressurizing gas for another adsorbent bed having completed its desorption step. Any remaining diverted product portion may, for example, be used for purging still another adsorbent bed during its desorption step. The aforementioned relative adsorption rate sensing is converted into a transmittable signal, either electrical or pneumatic, and the diverted gas return flow rate to the process is controlled by the transmitted relative adsorption rate signal such that the ratio of the relative adsorption rate to the diverted gas return flow rate is constant.

In a preferred embodiment of the invention, the product repressurization gas pressure is also sensed during repressurization of the desorbed first bed, and this sensing is converted into a transmittable signal (either pneumatic or electric) when the pressure rises to a predetermined value, preferably within 5–10 psi of the first higher pressure of the feed gas mixture. The signal is employed to simultaneously: (1) terminate repressurization of the first bed and return same to the selective adsorption step, and (2) initiate cycle changes in the other beds.

It is seen that the control method of this invention maintains constant and uniform flows within the system without pressure upsets and without the need for surge volume or damping devices. Moreover, it controls the flow rate of diverted product gas used for restoration of the adsorbent beds and maintains this flow proportional to the relative adsorption rate. The length of the adsorption step is also dependent upon the relative adsorption rate, and thereby the control method in essence meters the proper volume of feed to each adsorber which the adsorber is capable of handling during each cycle. Yet the control method functions independent of time and is responsive only to the relative adsorption rate.

All other factors constant, an adsorber of given size can purify approximately a fixed volume of feed (total gas load) during an adsorption step regardless of the feed flow rate. If the feed flow increases, the capacity of the adsorber will be used more rapidly, the cycle time must be shortened, and vice versa. In general, the cycle time should be inversely proportional to the flow rate through the adsorber. The present invention affords such capacity control in conjunction with diverted gas flow rate control.

As stated previously herein, all other factors may not necessarily remain constant and several other variables can occur which will influence the adsorbate capacity of the bed and/or the rate at which this capacity is utilized. The present invention is capable of accommodating any and all such factors which influence the relative adsorption rate. The system accepts whatever external demand is placed upon it, and makes the necessary internal adjustments to maintain smooth and efficient operation.

The apparatus aspect of the invention includes at least three adsorbent beds with interconnecting conduits and associated valving for consecutive introduction of the feed gas mixture to one end of each bed as the adsorption bed at first higher pressure with discharge of one-component depleted product gas from the bed's other end, depressurization to second lower pressure for desorption and at least partial repressurization of the desorbed bed by the product gas followed by recontact with the feed gas mixture.

The apparatus also requires means for sensing the relative adsorption rate in the adsorption beds when contacted with the feed gas mixture. Conduit means are employed for diverting a portion of the product gas discharged from each adsorption bed when contacted with the feed gas and returning the diverted product gas portion to the adsorption beds. Flow control means, as for example, a variable restriction, are provided in the product gas diverting conduit. Means are also provided for transmitting signals from the relative adsorption rate sensing means to the aforementioned flow control means for adjustment to maintain a predetermined constant ratio of relative adsorption rate to the diverted product gas return rate.

In a preferred embodiment, this apparatus moreover requires means for sensing the product gas repressurization, and pressure between the flow control means and the one end of the adsorbent beds. Cycle flow sequencing means are associated with the aforementioned interconnecting conduits and valving for initiating the flow changes among the adsorbent beds. The product gas repressurization pressure sensing means may for example be located in the beds themselves or in conduits joining the beds. Other means (either electrical of pneumatic) transmit signals from the product gas repressurization rate sensing means to the cycle flow sequencing means when the repressurization gas rises to a predetermined value. These signals simultaneously: (1) terminate repressurization of each bed and return same to the adsorption step, and (2) initiate cycle changes in the other beds.

In another embodiment, means are provided for sensing the mass transfer adsorption front in each of the adsorbent beds, along with means for transmitting signals from this sensing. Additional means are included for sensing the product gas repressurization pressure between the flow control means and one end of the adsorption beds, also with means for transmitting these signals. Further means are provided for comparing the two signals and generating a third signal representative of this comparison and for regulating the flow of diverted product gas by the third signal. Cycle flow sequencing means are provided and associated with either the mass transfer front sensing means or the repressurization pressure sensing means.

The control system of this invention may, for example, be used in a pressure swing process to separate gas mixtures containing hydrogen as the major component along with selectively adsorbable minor components such as light aliphatic hydrocarbons, carbon monoxide, carbon dioxide, ammonia, hydrogen sulfide, nitrogen, argon, and water. Hydrogen-rich feed gas containing at least one of these adsorbable components include: catalytic reformer off-gas, methanol synthesis loop purge, dissociated ammonia, demethanizer overhead gas, steam reformed hydrocarbons, ammonia synthesis loop purge gas, electrolytic hydrogen and mercury cell hydrogen. The invention is also useful for separating the aforementioned adsorbables from gas mixtures in which nitrogen or helium is the primary constituent. The adsorbent is selected on the basis of the desired separation, and may, for example, be a crystallize zeolitic molecular sieve, activated carbon or silica gel.

BRIEF DESCRIPTION OF THE DRAWINGS

In the drawings:

FIG. 7 is an illustrative time sequence for the various cycle steps suitable for the FIG. 6 system.

Corresponding items have been designated by the same number in the various drawings.

DESCRIPTION OF THE PREFERRED EMBODIMENTS

Figure 1:
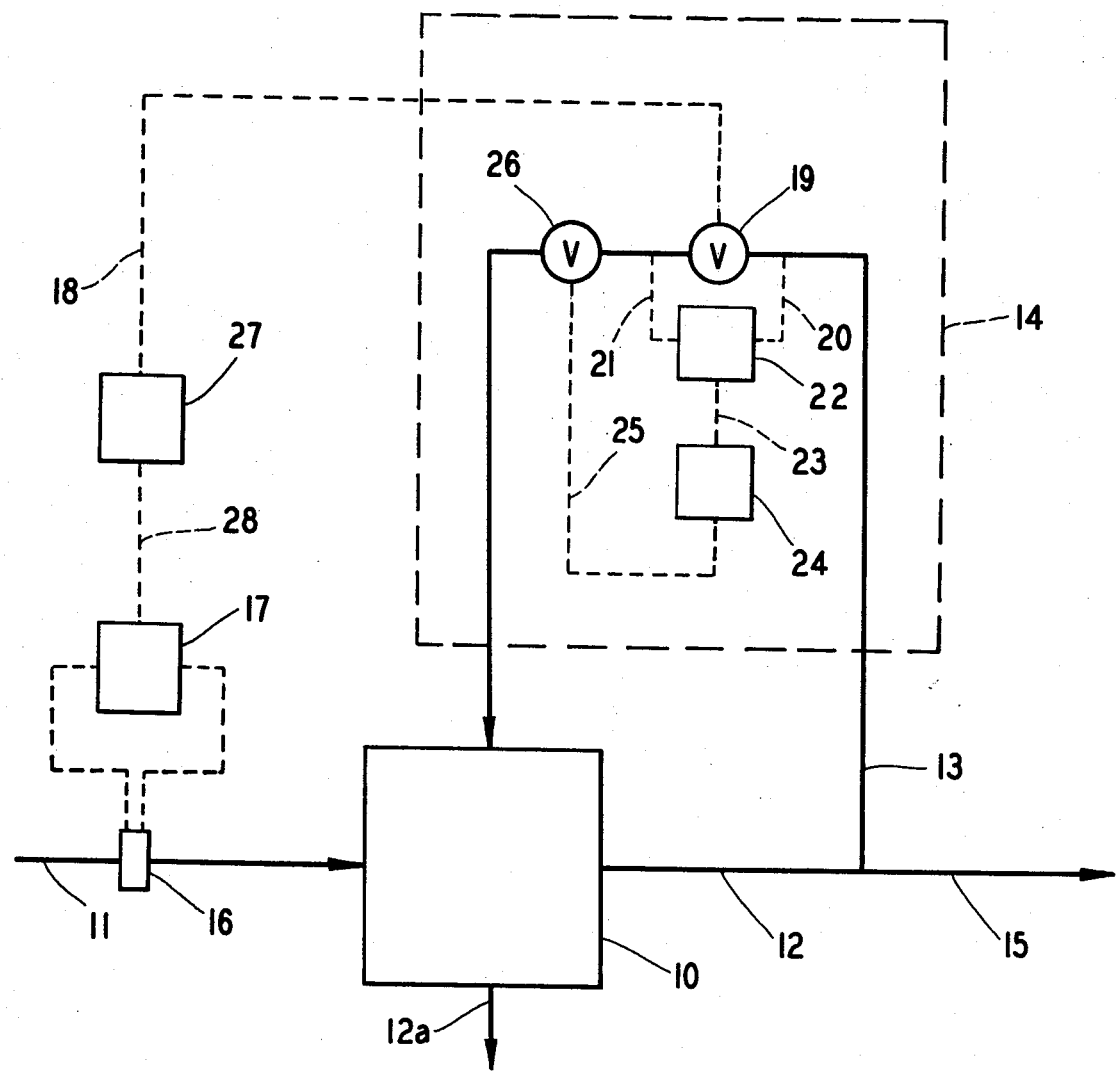
FIG. 1 is a schematic flow sheet of apparatus suitable for practicing the capacity control system of the invention.

Referring now to the drawings, FIG. 1 shows a capacity control system suitable for pressure swing adsorption process 10. The feed gas mixture enters through conduit 11 at first higher pressure whereupon at least one component is selectively adsorbed in process 10 and the one component-depleted product gas discharged therefrom through conduit 12 still at about the same pressure (ignoring pressure drop in the adsorbent bed). A desorbed gas stream is discharged from process 10 through conduit 12a at second lower pressure. A portion of the product gas is diverted through conduit 13 and returned to process 10 with at least part thereof used as repressurizing gas for a desorbed adsorbent bed. Prior to return the flow rate of this diverted product gas is adjusted in the diverted gas flow rate control system 14. The undiverted product gas from conduit 12 is discharged from the system through conduit 15.

The feed gas flow rate to process 10 is sensed as a differential pressure across orifice 16 in conduit 11, converted into a signal by transmitter 17 and passed through electric or pneumatic means 18 as a control signal to variable restriction 19 in diverted product gas conduit 13. As illustrated item 19 is an automatically positioned valve whose degree of restriction depends on the magnitude of the control signal 18. Two pressure taps 20 and 21 upstream and downstream respectively of flow resistance 19 are connected to differential transmitter 22 which generates a signal 23 representative of $\Delta P$ 20, 21. Signal 23 is fed to differential pressure control 24 which compares the signal to a preselected value and generates a signal 25 indicative of variation, plus or minus, from a preselected $\Delta P$ across 19. Signal 25 operates flow regulator 26 located in diverted product gas conduit 13 downstream of flow restriction 19 and upstream of the return to process 10. Signal 25 operates flow regulator 26, trimming the flow of diverted gas to maintain $\Delta P$ 20, 21 at the preselected value.

As long as signal 18 remains steady, restriction 19 will remain unchanged and the flow of diverted gas returned to process 10 will be held at a constant value. However, should feed gas flow rate signal 18 change, for example, if it should increase in value due to a flow rate increase, restriction 19 will open incrementally and present less resistance to flow, and the diverted gas flow rate will therefore increase until the value of $\Delta P$ 20, 21 is again restored to the preselected value. In this manner the total resistance in diverted product gas conduit 13 is adjusted so that the rate of diverted gas flow to process 10 is responsive to the magnitude of feed gas flow rate signal 18 and is uniform and smooth at any steady value of signal 18.

Summarizing the foregoing, the flow rate of diverted gas is dependent upon the demand imposed upon the system. The diverted gas is regulated by maintaining a desired rate of flow through a restriction in the diverted gas stream. Capacity-responsive control is obtained by adjusting the set point of the total restriction in the diverted gas stream in response to the relative adsorption rate imposed on the system.

If the signal produced by the relative adsorption rate monitoring means is non-linear, it may be preferable to convert the signal to a linear function of flow. The pressure differential across orifice 16 is a function of the square of the flow and may require such a conversion. Conversion to a linear signal is desirable when a variable restriction is used in the diverted gas flow rate control system, such as automatically positioned valve 19. Device 27, as for example an electric or pneumatic analog computer, converts signal 28 to one which varies linearly with the feed flow rate. If a fixed restriction 19 were used in the diverted gas flow rate system 14, as for example, an orifice, the adsorption rate signal from transmitter 17 need not be converted to a linear function of flow.

Figure 2:
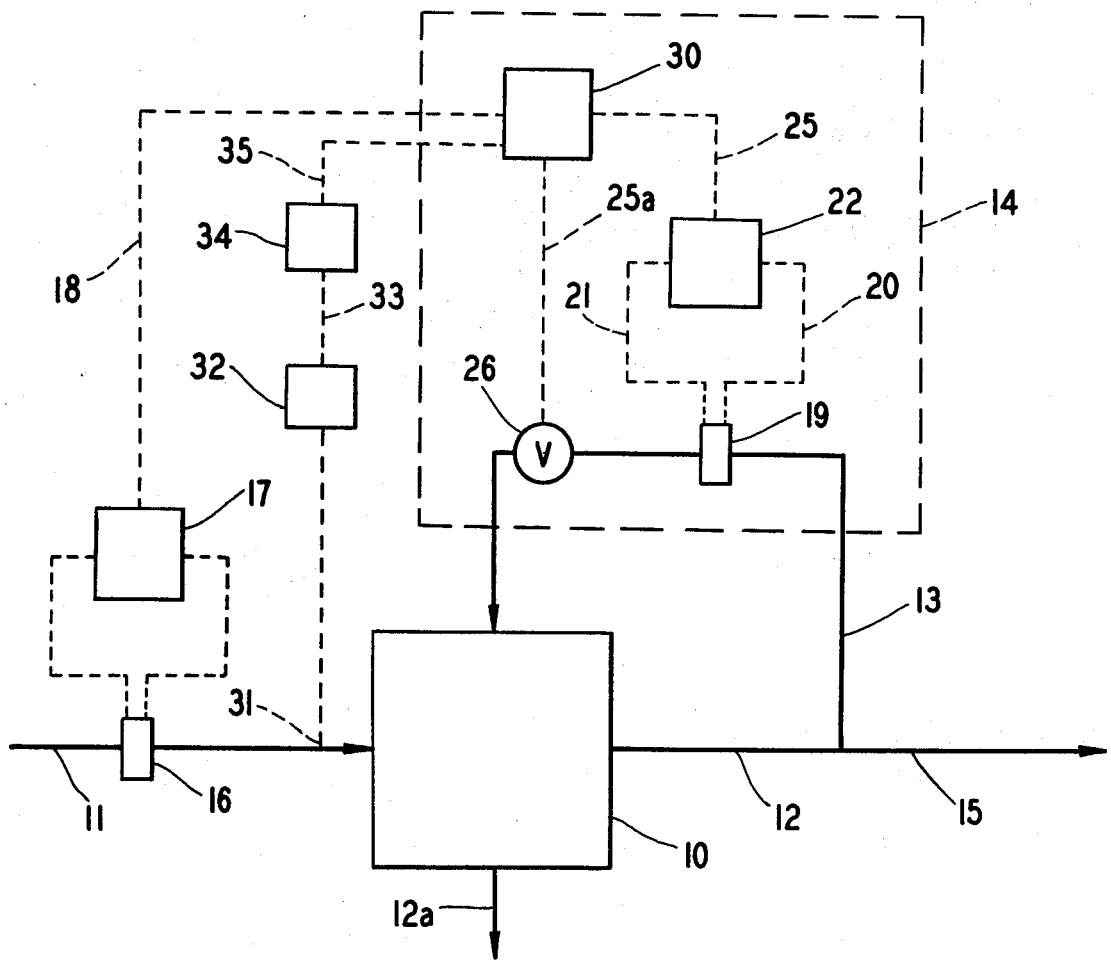
FIG. 2 shows an alternative capacity control system affecting the relative adsorption rate.

FIG. 2 illustrates another capacity control embodiment using an orifice for diverted gas flow rate sensing, and feed gas pressure as another variable sensed as affecting the relative adsorption rate (in addition to feed gas flow rate). The differential pressure across orifice 19 is fed through pressure taps 20 and 21 to transmitter 22 and the resultant signal 25, like signal 18 from feed flow rate differential transmitter 17, is a function of the square of the flow rate. Both signals 18 and 25 may be fed to flow ratio controller 30 which ratios the two flows and generates a signal 25a representative of the variation, plus or minus, from a preset desired value of the ratio. Signal 25a is transmitted to regulator 26, arranged in series with orifice restriction 19 to maintain the desired ratio between the feed gas flow rate and the diverted gas flow rate as described in connection with the FIG. 1 embodiment.

Since the feed gas pressure affects adsorbent capacity, it can therefore influence the quantity of feed and the time required to load the bed to the allowable limit, i.e. the relative adsorption rate. The feed gas pressure is sensed through tap 31 by transmitter 32, and the latter in turn generates a signal 33, electric or pneumatic, which is converted by analog computer 34 into a message reflecting the appropriate relationship between pressure and adsorbent capacity. The resultant signal 35 is fed to the flow ratio controller 30 where it adjusts the set-point. For example, if the feed gas pressure rises with other factors remaining constant, the relative adsorption rate decreases, the duration of the adsorption step can be increased and the diverted gas flow rate will be reduced so as to extend its flow uniformly over the longer time span of the adsorption step.

Figure 3:
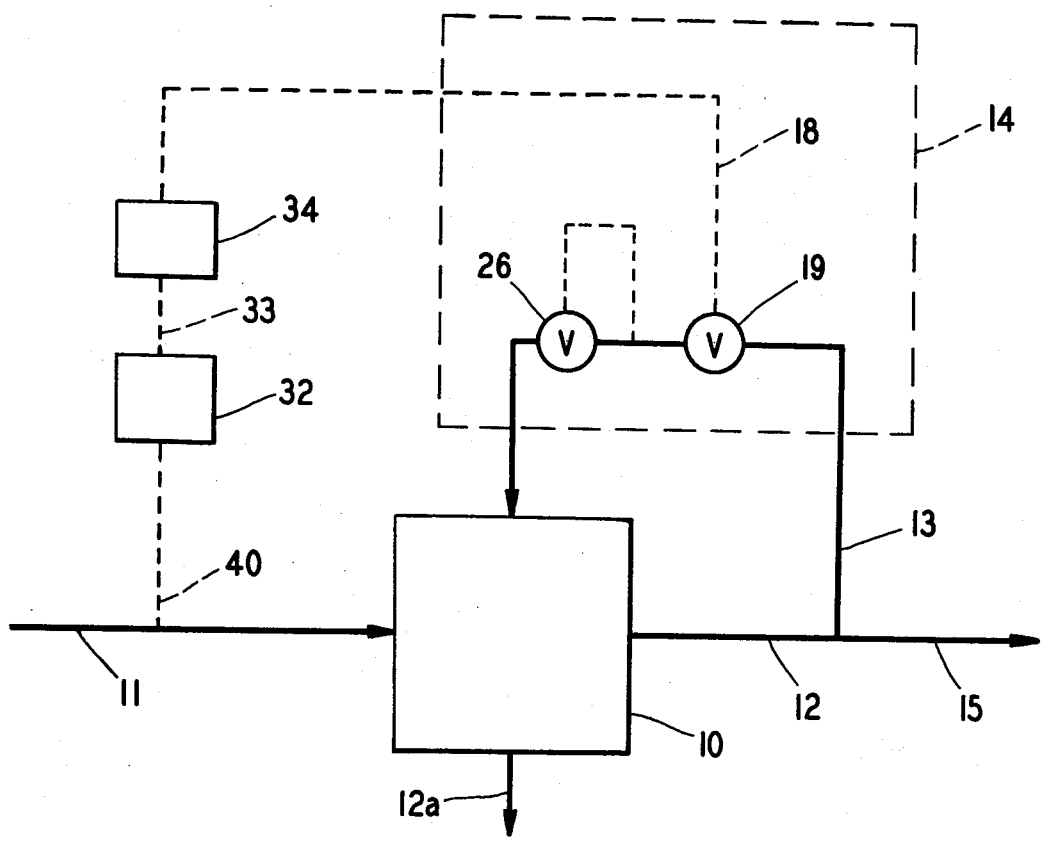
FIG. 3 is still another capacity control system using feed gas temperature sensing.

FIG. 3 is still another capacity control embodiment employing feed gas temperature as the only sensed variable affecting the relative adsorption rate. This system is simpler than FIGS. 1 and 2 and can be used if all variables other than temperature are expected to remain constant. The feed gas temperature is sensed through probe 40, as for example a resistance bulb, which is connected to transmitter 32. The latter generates output signal 33 which in turn is modified by analog computer 34 into a message reflecting the proper relationship between feed temperature and adsorbent capacity. The resultant adjusted output signal 18 is used to adjust control valve 19 as a variable resistance in diverted product gas conduit 13. Regulator 26 is a back pressure valve which maintains a steady preselected pressure at a point between 26 and control valve 19. This arrangement presumes that the diverted product gas pressure upstream of valve 19 is already constant. Summarizing the operation of this embodiment, if the feed gas temperature should decrease, the adsorbent capacity increases and the relative adsorption rate decreases. The cycle can be lengthened and the diverted gas flow rate will be reduced appropriately.

In FIGS. 2 and 3, as in FIG. 1, at least a portion of the diverted gas is utilized for repressurizing the adsorbent beds following desorption. In most embodiments the repressurization gas constitutes the major portion of the diverted gas. In the following illustration, all of the diverted gas is used for repressurization.

Figure 4:
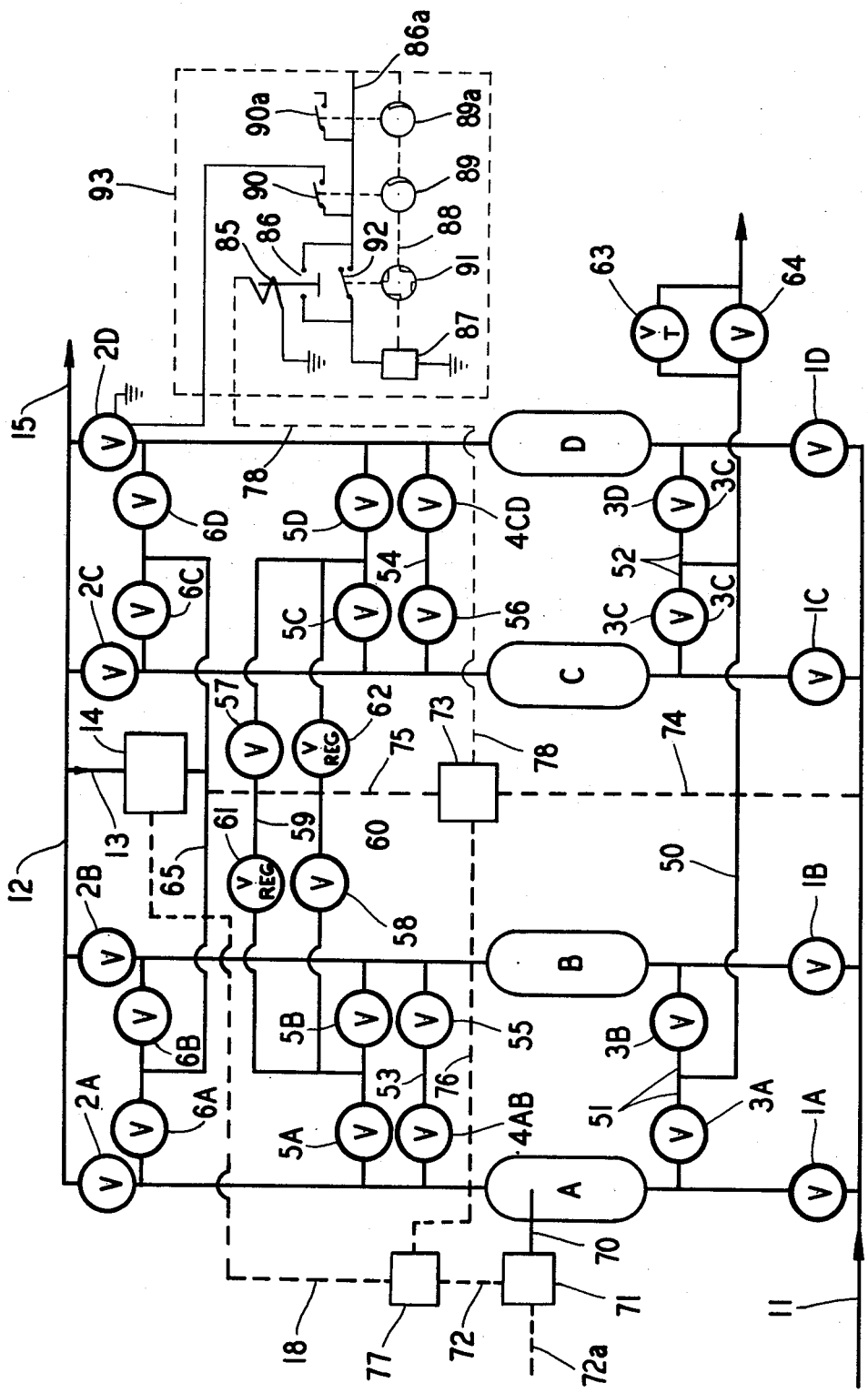
FIG. 4 is a schematic flowsheet of apparatus for practicing capacity control using adsorption front sensing and cycle control based on product repressurization gas sensing.

FIG. 4 illustrates still another embodiment in which the capacity control system aspect of the invention is employed in combination with a cycle control system based on sensing the product repressurization gas pressure during repressurization of the desorbed first bed, and the flow or repressurization gas is controlled in the previously described manner. The sensing of the repressurization gas pressure is converted into a transmittable signal when it rises to a predetermined value, and the signal is used to simultaneously: (1) terminate repressurization of the first bed and return same to the selective adsorption step, and (2) initiate cycle changes in the other adsorbent beds. In particular, the flow rate of diverted gas is adjusted to that the repressurization step is completed substantially simultaneously with completion of the adsorption step of the "on-stream" bed.

Four adsorbent beds A, B, C and D are connected in parallel flow relation between feed gas mixture manifold 11 and unadsorbed product effluent gas manifold 12. Automatic valves 1A, 1B, 1C and 1D direct feed gas flow respectively to first bed A, second bed B, third bed C and fourth bed D. Automatic valves 2A, 2B, 2C and 2D respectively direct product gas from the same beds into product manifold 12. The adsorbed components are rejected by countercurrent depressurization and purge through waste manifold 50 at the inlet end of the beds. Adsorbers A and B are joined at their inlet ends to waste manifold 50 by conduit 51 having automatic valves 3A and 3B therein. Similarly adsorbers C and D are joined to waste manifold 50 at their inlet ends by conduit 52 having automatic valves 3C and 3D therein.

Equalization conduit 53 is provided joining the discharge ends of adsorbers A and B; similarly equalization conduit 54 is provided joining the discharge ends of adsorbers C and D. To provide pressure equalization, automatic valves 4AB and 4CD are located in conduits 53 and 54 respectively. Valves 55 and 56 in series with equalization valves 4AB and 4CD respectively are manual preset throttling devices which prevent excessively high flow rates from occurring and which allow adjustment and balancing of equalization rates between the adsorption bed pairs AB and CD.

Automatic valves 5A, 5B, 5C and 5D are provided at the discharge ends of the bed, two of which open together to pass cocurrent depressurization gas from one adsorbent bed for use as purge gas in another bed. Manual valves 57 and 58 in the purge cross-over conduits 59 and 60 respectively serve the same purpose as explained previously for valves 55 and 56 in the pressure equalization circuit. The purge cross-over conduits 59 and 60 (piped in parallel flow relation) also contain back pressure regulators 61 and 62 oriented in opposite flow directions so as to control flow in either direction between either bed A or B and bed C or D. The back pressure regulators 61 and 62 are set to maintain a minimum pressure, e.g. 50 psi, in the bed undergoing cocurrent depressurization. When this pressure is reached the cocurrent depressurization and purge steps terminate. This arrangement prevents extension of cocurrent depressurization to excessively low pressure and therefore permits positive control of the one component's adsorption front during this step. The pressure can be chosen to prevent breakthrough of the front or to allow limited breakthrough, as desired.

As previously indicated, valves 55, 56, 57 and 58 are flow rate limiting devices which prevent bed damage due to excessive $\Delta P$ and fluid velocity. A similar precaution may be followed during countercurrent depressurization, by means of preset throttle valve 63 which acts as a bypass around main waste valve 64 in waste conduit 50. During countercurrent depressurization the automatic main waste valve 64 is closed which forces the gas to follow the bypass route through valve 63. During the following lowest pressure purge step, valve 64 opens to minimize flow resistance in the waste conduit 50.

The adsorption step is preferably terminated when the adsorption front of the adsorption front of the selected component is entirely within the bed. This point may be determined in a manner well-known to those skilled in the art, using the feed conditions and composition, and the adsorbent's capacity and dynamic characteristics. Also the pressure equalization step is preferably stopped when the adsorption front is still entirely within the bed and before breakthrough. This permits separation of the adsorbables from the void space gas by the adsorbent in the bed discharge end, so that the emerging equalization gas has virtually the same purity as the product gas. The succeeding cocurrent depressurization step may continue past the break through point as the emerging gas is used for purging only, and may be controlled by the aforementioned regulators 61, 62. Break through may, for example, be identified by monitoring the adsorbable concentration in the discharge gas, and detecting the moment at which this concentration appreciable increases. The purge step is most efficiently performed by removing only part of the adsorbables from the bed with the purge, gas, i.e. partial desorption. The countercurrent flow of purge and of product repressurization gas pushes the residual adsorbables back towards the inlet end. This insures a clean product during even the initial portion of the succeeding adsorption step.

The diverted product gas conduit 13 joins the diverted gas flow rate control system 14 and the gas at adjusted flow rate enters conduit 65 communicating by way of repressurization valves 6A–6D with the product conduits to adsorbers A–D respectively.

The operation of the product repressurization circuit may be illustrated with respect to adsorber D, and the other adsorbers A-C are repressurized in an analogous manner. After adsorber D has completed its lowest pressure purge step, valves 3D and 5D are closed and pressure equalization valve 4CD in conduit 54 is opened to afford the necessary flow communication with adsorber C (initially at a higher pressure). Either simultaneously with or when pressure equalization has been achieved, a portion of the product gas from adsorber A in product manifold 12 is diverted consecutively through conduit 13 and diverted gas flow rate control system 14, conduit 65 and thence through valve 6D for flow into the discharge end of adsorber D. This flow continues until adsorber D has been repressurized to about the product pressure. Feed valve 1D and product valve 2D are, of course, closed throughout repressurization.

To practice the capacity control aspect of this invention, a gas sample is withdrawn from the on-stream bed, e.g. bed A through probe 70 and is analyzed either continuously or intermittently in analyzer 71. Preferably the probe 70 is located at the limiting point to which the mass transfer front will be permitted to advance before switching to a desorbed and repressurized bed. Continuous or repetitive analysis of the gas sample will show a sharp rise in adsorbate content when the front reaches the probe, thereby indicating that the bed is loaded to its allowable capacity. Analyzer 71 is selected to suit the component to be monitored - usually the least strongly adsorbable component to be held within the bed. Suitable analyzers include a thermal conductivity cell for detecting a nitrogen, argon or carbon monoxide front, and a flame ionization unit for detecting a hydrocarbon front. The analyzer 71 should be adapted to generate an output signal 72, e.g. an electrical pulse, at the moment it detects the front at the probe location.

The repressurization level in another bed, e.g. bed D, is independently monitored by means of differential pressure cell 73. This instrument senses the $\Delta P$ between the feed conduit 11 and the flow rate-adjusted repressurization gas in conduit 65 by means of pressure taps 74 and 75. When the so-measured $\Delta P$ drops to a predetermined value, e.g. 5–10 psi, the differential pressure cell 73 generates a signal 76, as for example, an electrical pulse.

Signal 72 indicating completion of the bed A adsorption step and signal 76 indicating completion of the bed D product repressurization step are both directed to instrument 77. The latter in turn produces signal 18 used to control the set point of the flow restrictor 19 (see FIG. 1 or 3) in the diverted product gas conduit 13 of diverted gas flow rate control system 14. Instrument 77 is designed to generate signal 18 at an intensity dependent upon the time interval between the occurrences of signals 72 and 76. If the latter signals are received coincidentally (time interval is zero), then the cycle is "balanced" and output signal 18 will remain unchanged. If analyzer signal 72 is received first, it is an indication that adsorption has progressed faster than repressurization, and instrument 77 will alter signal 18 in a direction to accelerate the rate of repressurization. Conversely, if repressurization signal 76 is received first, it is an indication that repressurization has progressed faster than adsorption and instrument 77 will alter signal 18 in the opposite direction so as to slow the rate of repressurization. In one form of instrument 77 the alteration of signal 18 commences upon receipt of the first signal and stops upon receipt of the second. During this alternation period, the rate of change of the signal is steady, so that the total correction of the signal reflects the degree of unbalance in the cycle. Instrument 77 may be a commercially available electric or pneumatic motor-driven ramp generator which alters its output up or down, proportionate to the time interval between input signals, and which holds a steady output when the time interval is zero.

The advantage of the FIG. 4 capacity control embodiment is that it adjusts for any variable or combination of variables which affects the relative adsorption rate of an adsorbent bed. For example, an increase in feed rate, an increase in feed temperature, a decrease in feed pressure, an increase in adsorbate content of the feed, or a progressive loss of adsorbent activity will each tend to accelerate the relative adsorption rate. If adsorbent bed A loads more rapidly, analyzer 71 will detect the adsorption front sooner and through signal 18 to diverted gas flow rate control system 14, the product repressurization gas rate through conduit 65 and valve 6D to bed D will be accelerated.

Figure 5:
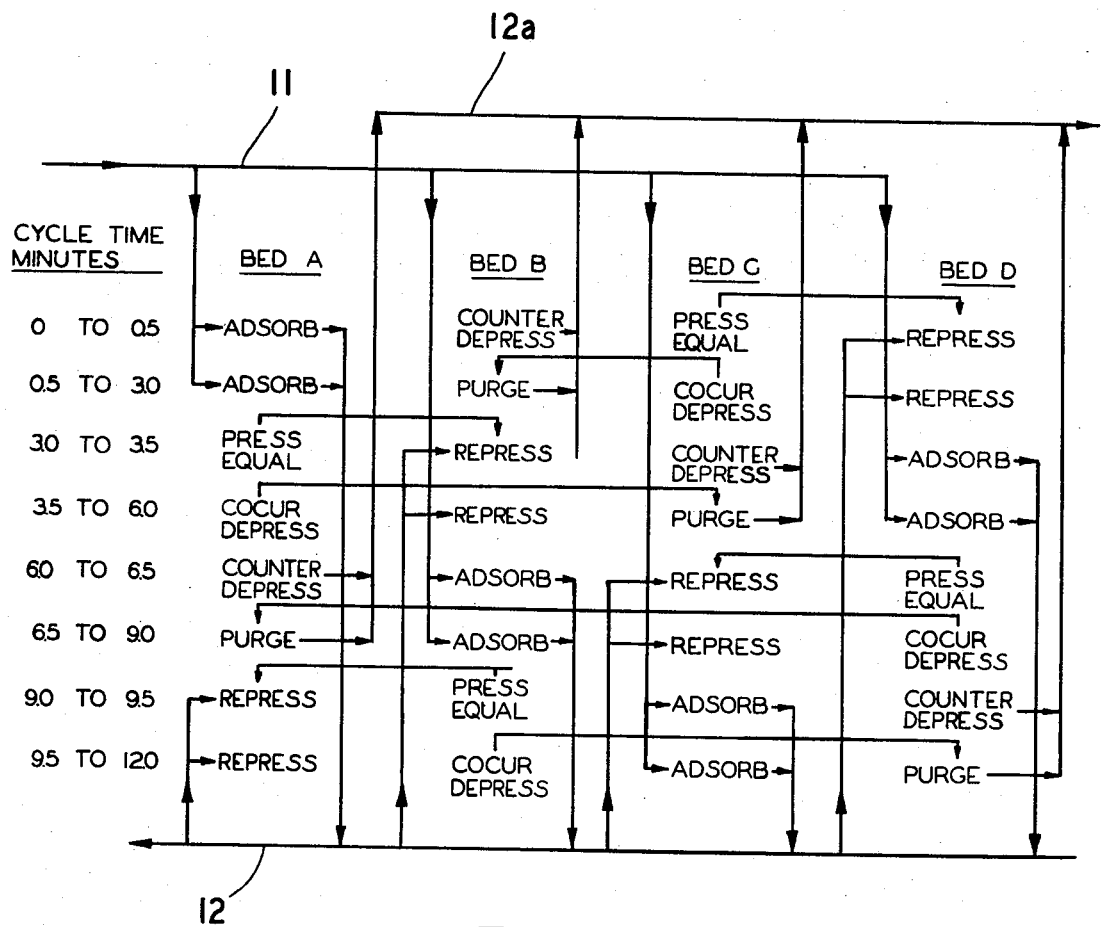
FIG. 5 is an illustrative time sequence for the various cycle steps as might be practiced with the FIG. 4 capacity and cycle control system.

FIG. 5 illustrates a particular process involving a six-step sequence which is claimed in my aforementioned application Ser. No. 659,381 and which may be controlled by a preferred capacity and cycle system of this invention using four adsorbent beds piped in parallel flow relation. The repeating cycle steps include in sequence: (1) contacting a gas mixture at first higher pressure with a first bed for selective adsorption of at least one component and discharge of one-component depleted product gas (the adsorption step), (2) pressure equalization to a second intermediate pressure with a second previously desorbed bed initially at lower pressure by flowing void space gas thereto (the pressure equalization step), (3) cocurrent depressurization to a third lower-than-intermediate pressure by flowing additional void space gas from the first bed through a third bed as purge gas (the cocurrent depressurization step), (4) counter-current depressurization to a lowest pressure for partial desorption and partial removal of the one component (the countercurrent depressurization step), (5) countercurrent purging by cocurrent depressurization gas from a fourth bed at the lowest pressure for desorption and removal of the remaining one component (the purge step), and (6) countercurrent repressurization of the desorbed first bed to a higher pressure by introduction of void space gas from the second adsorbent bed and product gas from the third adsorbent bed such that the last part of repressurization is performed with only the product gas (the repressurization step). The last step is followed by recontact of the feed gas mixture with the fourth, second and third beds successively following the first bed in the adsorption and succeeding cycle step sequence.

In FIG. 5 the streams flowing into and out of the four-bed system are indicated by vertical lines connecting the feed manifold 11, the unadsorbed product effluent manifold 12 and the desorbate waste manifold 12a. The feed manifold 10 connects vertically with each of the four adsorption steps and the latter in turn join vertically with the product manifold 12. The countercurrent depressurization and purge steps, during which the adsorbed component is discharged from the beds, are connected vertically with the desorbate waste manifold 12a. The repressurization steps which use a portion of the unadsorbed product effluent are connected vertically with the product manifold 12. The utilization within the system of the cocurrent depressurization gas is indicated by horizontal flow lines, so that each pressure equalization step is connected horizontally with a repressurization step in another bed. Each cocurrent depressurization step is connected horizontally with a purge step in another bed. All gas flows associated with the four beds are identified on the figure.

In this particular cycle and in terms of any single bed, adsorption accounts for one-fourth of the total cycle, pressure equalization and cocurrent depressurization account for one-fourth, countercurrent depressurization and purge for another one-fourth, and repressurization for the remaining one-fourth.

As illustrated in FIG. 4, when the ΔP between the feed gas and the diverted product repressurization gas drops to a predetermined value as sensed by differential pressure cell 73, the latter generates signal 78 which produces the series of valve changes necessary for placing the fourth bed (bed D) on the adsorption step. Referring to FIG. 5, it is seen that a termination of the repressurization step (and initiation of the adsorption step) in bed D (fourth bed) occurs after 3 minutes of repressurization — a quarter point in the four-bed cycle. The termination of repressurization also corresponds in time to the following additional events occurring in the other adsorbers.

| | |
|---|---|
| Termination of adsorption and start of pressure equalization | bed A (first bed) |
| Termination of purge and start of repressurization | bed B (second bed) |
| Termination of cocurrent depressurization and start of countercurrent depressurization | bed C (third bed) |

Signal 78 generated by differential pressure cell 73 can be used to produce each of the four previously enumerated cycle changes but not: (1) termination of pressure equilization and start of cocurrent depressurization, or (2) termination of countercurrent depressurization and start of purge. These latter changes occur only a short interval of time after occurrence of the first mentioned changes, e.g. 30 seconds. This interval can be made a fixed time period without detriment to cycle performance, and it is conveniently measured by means of a timing device.

Referring to FIG. 4, one suitable method is illustrated of utilizing signal 78 to produce the desired cycle changes including the above-mentioned short fixed time intervals. Signal 78 is led to valve operator circuit 93 where it energizes coil 85 of a relay and thereby closes contacts 86. This establishes a circuit from a power source 86a to a motor 87 which operates camshaft 88. The motor together with any required gearing is designed to turn the camshaft one-fourth revolution in at least the span of time which should elapse between the two groups of valve changes listed above, e.g., 30 seconds.

As the camshaft begins to rotate, cam 89 immediately closes contacts 90, thereby establishing a circuit to valve 20 and the valve opens. Additional cams (e.g., 89a) are provided as needed to operate switches e.g., 90a) for energizing or de-energizing other valves which operate simultaneously with valve 2D. Another cam 91 also closes contacts 92 to establish a by-pass circuit around relay contacts 86 and thus maintain power to motor 87. This is needed because signal 78 to coil 85 will be interrupted as soon as the first set of valve changes occur, due to the re-connection of repressurization manifold 65 to another bed at low pressure.

The motor and camshaft continue to turn through the time interval needed for pressure equalization and cocurrent depressurization, whereupon still other cams on the shaft operate switches to effect the second group of valve changes listed above. Immediately upon completion of the second group of valve changes, cam 91 re-opens contacts 92 and stops the motor. The motor does not resume operation until the ΔP sensed by differential pressure cell 73 again drops to the predetermined value (e.g. 5–10 psi) and signal 78 is repeated. When signal 78 is repeated, the motor will turn the camshaft through the next one-fourth revolution and a separate set of cam switches will function to effect the valve changes occurring at that quarter point of the cycle.

It will be apparent from FIG. 5 and the valves associated with the cycle changes that a number of valves may operate simultaneously. For example, the operation of valve 2D (as aforedescribed) may coincide in time with the operation of valves 1D, 3C and 6B. All such valves which function together may be energized and de-energized by the same cam and switch, thereby simplifying the operating mechanism.

It will also be apparent that the cam-type operator does not dictate the time span of the cycle because it remains off during a portion of each quarter-cycle and resumes rotation only upon demand by the process. The only time interval which it controls is the relatively short span between the first and second group of valve changes constituting a cycle changeover.

It should be noted that signal 78 is based on pressure difference between feed gas manifold 11 and the repressurization gas manifold 65, rather than the pressures within or adjacent to particular adsorbent beds. This arrangement has the advantage that a single $\Delta P$ transmitter 73 may serve all beds without changing the pressure taps 74 and 75 from bed-to-bed. However, if desired, the pressure taps could be changed from bed-to-bed, and means for effecting such operation, such as a stepping relay or an intermittently operated cam switch are well-known to those skilled in the art.

By similar means, the probe 70 which conducts the gas sample from each bed to analyzer 71 can be transferred from bed-to-bed. The transfer can be readily effected using electrically operated valves energized sequentially by a stepping relay, cam switches or the like.

Summarizing the FIGS. 4-5 cycle control system as described above, the product gas repressurization signal is used to simultaneously: (1) terminate repressurization of the fourth bed and return it to the selective adsorption step, (2) terminate the cocurrent depressurization step in the third bed and initiate the countercurrent depressurization step, (3) terminate the selective adsorption step in the first bed and initiate the pressure equalization step, and (4) terminate the countercurrent purging step in the second bed and initiate the countercurrent repressurization step.

It is seen that two events are caused to occur substantially simultaneously: the completion of adsorbate loading in one bed and the completion of repressurization in another desorbed bed. In the cycle control system of FIG. 4, a signal denoting each event is generated independently. Because of their near-coincidence in this embodiment, either of the signals could be employed to switch the beds at the changeover points in the cycle. Thus, the use of a signal 72a from the on-stream bed for this purpose is an alternative to the above-described use of signal 78 from the repressurized bed, and use of signal 72a in the valve operator circuit 93 could be identical to signal 78.

Although the four-bed embodiment of the invention is preferred, a smaller or larger number of beds is also contemplated. The three-bed system of FIG. 6 and its cycle program of FIG. 7 lacks some of the flexibility and economy of four beds inasmuch as the purge step does not coincide with a depressurization step elsewhere in the system. Thus, cocurrent depressurization gas is not available for purging another bed as practiced in FIGS. 4-5. The FIG. 6-7 embodiment instead employs product gas for purge. The purge step occurs intermittently and coincides with the terminal phase only of a repressurization step. In the illustrative 18 minute cycle of FIG. 7, the 4 minute purge step of bed A (between the 8th and 12th minutes of the cycle) coincides with the last 4 minutes of the bed B repressurization step and the bed C adsorption step. During this period a first part of the diverted product gas from the discharge end of bed C is returned to the discharge end of bed A for purging thereof.

In the previously described embodiments, the diverted portion of the product gas was used in the system for only one purpose — repressurization of a previously desorbed bed. Under these conditions, both the repressurization and diverted product gas flows may be held constant. In the three bed embodiment, the diverted product gas is used in the system for two purposes. A first part of this continuously flowing stream is intermittently returned to the process as purge gas for a depressurized bed at lower pressure. Accordingly, the flow of the diverted product gas to be used for repressurization of another bed cannot be held uniform at all times without wide fluctuation of the total diverted product gas flow rate.

Figure 6:
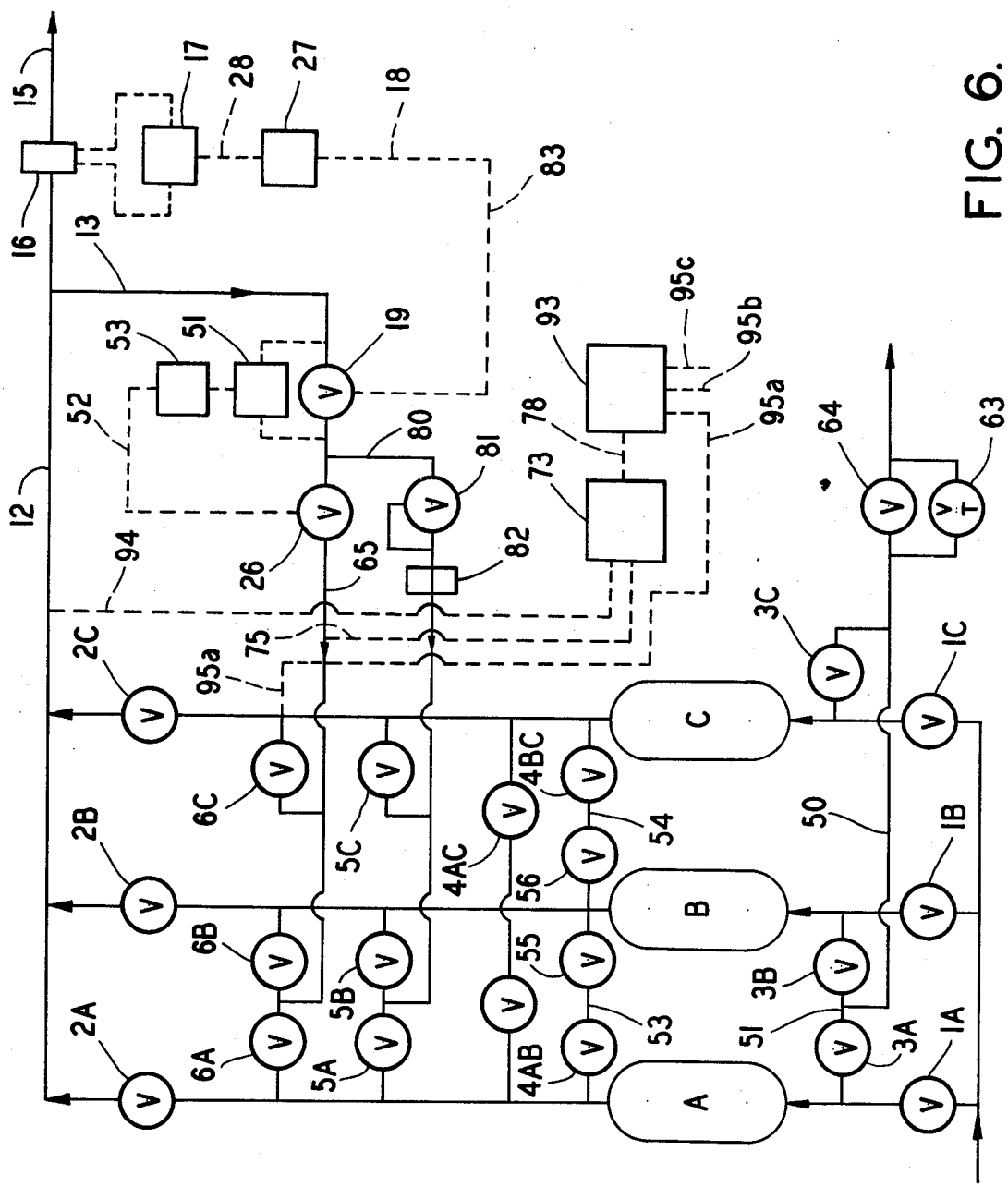
FIG. 6 is a schematic flowsheet of a capacity and cycle control system suitable for three adsorbent beds in parallel flow relation.

To avoid flow and pressure upsets in the product conduit 15, the FIG. 6 system maintains the sum of the repressurization gas and purge gas (comprising the diverted product gas portion) constant. The total diverted product is fed through conduit 13 and variable restriction 19 therein illustrated as a control valve. A first part is split off through branch conduit 80 and manifolded as purge gas to the depressurized bed through valve 5A, 5B or 5C. Automatic purge discharge valves 3A, 3B and 3C joining waste gas manifold 50 operate intermittently and may for example be open only 4 minutes of an 18 minute cycle. When one of these valves is open, the purge gas flow is held constant at a predetermined rate, as for example by means of flow regulator 81 in series with critical flow orifice 82. The flow rate through orifice 82 is dependent only on its upstream pressure which is held constant by regulator 81.

When purge gas flows through conduit 80, downstream regulator 26 immediately reduces the flow of repressurization gas to restore constant total flow through diverted gas flow restrictor 19. In this manner, the flow of repressurization gas is reduced during the purge step by an amount equal to the purge gas flow. Regulator 81 should be set to hold the rate of purge flow which will deliver the total volume of purge gas needed to clean each bed within the time allowed for purging (e.g. 4 minutes).

The use of a portion of the total diverted gas for purging will not necessarily upset the proportionality between the repressurization gas flow rate and the relative adsorption rate. Therefore, valve sequencing can still be controlled by the repressurization pressure. However, special provision may be necessary to hold the total quantity of purge constant during each cycle - hence, to hold the purge period constant. A constant purge period would not be obtained when purge and repressurization terminate simultaneously (e.g. FIG. 7) because the purge period is shortened or lengthened in accordance with changes in the relative adsorption rate. It will be apparent to those skilled in the art that means for holding a fixed purge period can be readily incorporated into a valve operator system such as 93 of FIG. 4, For example, the duration of motor operation need only be extended to include the desired purge period so that the purge period can be terminated as well as initiated by the cam switch.

Another distinctive feature of the FIG. 6 embodiment is sensing of the product gas flow rate (by orifice 16) as a variable representative of the relative adsorption rate. The elements communicating between orifice 16 and control valve 19 are analogous to those previously described in connection with the feed gas sensing of FIG. 1.

Cycle control is provided in the system of FIG. 6 in a manner similar to that shown in FIG. 4. The $\Delta P$ transmitter 73 is connected to compare and pressure of the bed undergoing repressurization with a pressure corresponding essentially to feed pressure. In FIG. 4, the ΔP transmitter is connected between the feed manifold 11 and the repressurization manifold 65. Alternatively in FIG. 6 the ΔP transmitter 73 is connected to the product manifold 12 by pressure tap 94, and to the repressuriza-tion manifold 65 by pressure tap 75 — the product pressure being essentially the same as the feed pressure.

The signal 78 generated by the ΔP transmitter 73 indicates completion of repressurization and is fed to a valve operator circuit 93 similar to the circuit of FIG. 4. Accordingly, circuit 93 of FIG. 6 has been illustrated as a box to avoid duplication with FIG. 4. Power to operate the various automatic valves is provided in the proper order via the cam switches, e.g., through connection 95a to valve 6C.

In a preferred embodiment of this invention, a four-bed system as described and illustrated in FIG. 4 is employed, but with the relative adsorption rate sensing arrangement of FIG. 1 and the cycle step of FIG. 5. This system is especially advantageous for recovering hydrogen from various source streams and for delivering hydrogen product at ultra-high purity. For example, this system successfully performed the separation shown in Table I with 76.5 percent recovery of hydrogen when operated at 195 psig feed pressure, at 70° F. and on a 32-minute cycle which was otherwise similar to FIG. 5. The feed gas flow rate was 34,200 cu. ft./hr. and the diverted product gas flow rate was 7,400 cu. ft./hr. with all of the latter being used for countercurrent repressurization of the desorbed adsorbent beds. Under these conditions the ratio of relative adsorption rate, i.e. feed gas flow rate to the diverted gas return flow rate was 4.62. In this particular system each adsorbent bed comprised an activated carbon first section for selectively removing water and $CO_2$, and a calcium zeolite A second section for selectively removing CO and $CH_4$.

TABLE I

| | Feed | Product |
|---|---|---|
| $H_2$ | 77.1% | 99.9999 + % |
| $CH_4$ | 0.013% | Not detectable (<¼ ppm) |
| CO | 0.35% | Not detectable (<¼ ppm) |
| $CO_2$ | 22.5% | Not detectable (<¼ ppm) |
| $H_2O$ | Saturated | Dry (<−100°F. dewpoint) |

In another four bed embodiment employing the capacity control system of FIG. 1, the cycle control system of FIG. 4 and the cycle steps of FIG. 5, the feed gas could be about 99.7 percent $H_2$, 0.3% light saturated aliphatic hydrocarbons and saturated with water at feed conditions and supplied at flow rate of 10,500 cu. ft./hr. The product may comprise 99.9999% $H_2$, and 2,480 cu. ft./hr. might be diverted for return to the system as repressurization gas. Under these conditions the ratio of relative adsorption rate to the diverted gas return flow rate would be 4.24.

Although certain embodiments have been described in detail, it will be appreciated that other embodiments are contemplated along with modifications of the disclosed features, as being within the scope of the invention.

What is claimed is:

1. In a substantially adiabatic pressure swing adsorption process for continuously separating feed gas mixture in at least three adsorbent beds by the repeating cycle steps of sequentially contacting said feed gas mixture with each bed at first higher pressure for selective adsorption of at least one component and discharge of a one component depleted product gas, desorption of depressurization of the bed to second lower pressure and at least partial repressurization of the desorbed bed with said product gas followed by recontact of said desorbed bed with said feed gas mixture, an improved control method comprising the steps of:
   a. sensing the adsorption rate of a first adsorbent bed during the selective adsorption step;
   b. simultaneously and continuously diverting a portion of said product gas discharged from said first adsorbent bed for return to said process with at least part thereof continuously introduced during the entire adsorption step as repressurizing gas for another adsorbent bed, and discharging the undiverted product gas from said process;
   c. converting the relative adsorption rate sensing of a into a transmittable signal; and
   d. controlling the diverted gas return flow rate by means of the transmitted relative adsorption rate signal of c such that the ratio of said relative adsorption rate to the diverted gas return flow rate is constant.

2. A process according to claim 1 in which the feed gas mixture flow rate is sensed as step a.

3. A process according to claim 1 in which the product gas flow rate is sensed as step a.

4. A process according to claim 1 in which the gas composition is sensed in the first adsorbent bed as step a.

5. A process according to claim 1 in which the feed gas temperature is sensed as step a.

6. A process according to claim 1 in which the feed gas pressure is sensed as step a.

7. In a pressure swing adsorption process for continuously separating feed gas mixture in at least three adsorbent beds by the repeating cycle steps of sequentially contacting said feed gas mixture with each bed at first higher pressure for selective adsorption of at least one component and discharge of one-component-depleted product gas, desorption by depressurization of the bed to second lower pressure and at least partial repressurization of the desorbed bed by said product gas followed by recontact with said feed gas mixture, an improved control method comprising the steps of:
   a. sensing the relative adsorption rate connected with a first adsorbent bed during the selective adsorption step;
   b. simultaneously and continuously diverting a portion of said product gas discharged from said first adsorbent bed for return to said process with at least part thereof as repressurizing gas for another adsorbent bed, and discharging the undiverted product gas from said process;
   c. converting the relative adsorption rate sensing of a into a transmittable signal;
   d. controlling the diverted gas return flow rate to the process by the transmitted relative adsorption rate signal c such that the ratio of said relative adsorption rate to the diverted gas return flow rate is constant;

e. sensing the product gas repressurization rate as controlled in step (d) during repressurization of the desorbed first bed;

f. converting the product gas repressurization gas pressure sensing of (e) into a transmittable signal when it rises to a predetermined value; and g. employing the product gas repressurization signal to simultaneously: (1) terminate repressurization of said first bed and return the first bed to said selective adsorption step, and (2) initiate cycle changes in the other adsorbent beds.

8. A process according to claim 7 in which all of the diverted product gas from step b is returned to the process as repressurization gas for the desorbed bed.

9. A process according to claim 7 in which a first part of the diverted product gas from step b is returned to the process as purge gas for a depressurized bed at said second lower pressure, and the remaining part of the diverted product gas is returned to the process as repressurization gas for a purged and desorbed bed.

10. In a pressure swing adsorption process for continuously separating feed gas mixture in four adsorbent beds having void space between adjacent adsorbent particles by the repeating cycle steps of sequentially contacting said feed gas mixture at first higher pressure with a first bed for selective adsorption of at least one component and discharge of one-component depleted product gas, pressure equalization to second intermediate pressure with a second previously desorbed bed initially at lower pressure by flowing void space gas thereto, cocurrent depressurization to third lower-than-intermediate pressure by flowing additional void space gas from said first bed through a third bed as purge gas, countercurrent depressurization to a lowest pressure for partial desorption and partial removal of said one component, countercurrent purging by cocurrent depressurization gas from a fourth bed at said lowest pressure for desorption and removal of the remaining one component, and countercurrent repressurization of the desorbed first bed to a higher pressure by introduction of void space gas from said second adsorbent bed and product gas from a third adsorbent bed such that the last part of repressurization is performed with only said product gas, followed by recontact of said feed gas mixture with the fourth, second and third beds successively following the first bed in the adsorption and succeeding cycle step sequence, an improved control method comprising the steps of:

a. sensing the feed gas load rate to the first adsorbent bed during the selective adsorption step;

b. simultaneously and continuously diverting a portion of said product gas discharged from said first adsorbent bed at about said first higher pressure for return to said process as the product repressurization gas for another desorbed bed, and discharging the undiverted product gas from said process;

c. converting the feed gas load rate sensing of a into a transmittable signal;

d. controlling the diverted gas return flow rate to the process by the transmitted feed gas load rate signal (c) such that the ratio of said feed gas load rate to the diverted gas return flow rate is constant;

e. sensing the product gas pressure during repressurization of the desorbed first bed as controlled in step (d);

f. converting the product repressurization gas sensing of (e) into a transmittable signal when it rises to predetermined value; and g. employing the product gas repressurization signal to simultaneously: (1) terminate repressurization of said first bed and return the first bed to said selective adsorption step, (2) terminate the cocurrent depressurization step in said second bed and initiate the countercurrent depressurization step, (3) terminate the selective adsorption step in said third bed and initiate the pressure equalization step, and (4) terminate the countercurrent purging step in said fourth bed and initiate the countercurrent repressurization step.

11. Apparatus for continuously separating feed gas mixture by selective adsorption of at least one component at higher pressure and desorption at lower pressure under substantially adiabatic conditions employing at least three adsorbent beds with interconnecting conduits and associating valving for consecutive introduction of said feed gas mixture to one end of each bed as the adsorption step at first higher pressure with discharge of one component depleted product gas from the bed's other end, depressurization to second lower pressure for desorption and at least partial repressurization of the desorbed bed by said product gas following by recontact with said feed mixture comprising:

(a) means for sensing the relative adsorption rate in each of the adsorption beds when contacted with said feed gas mixture;

b. conduit means for simultaneously diverting a portion of the product gas discharged from each adsorption bed when contacted with said feed gas mixture and continuously returning during the entire adsorption step at least part of the diverted product gas to a desorbed bed for repressurization thereof;

c. flow control means in product gas diverting conduit means b; and d. means for transmitting signals from said relative adsorption rate sensing means a to said flow control means c for adjustment of diverted product gas flow to maintain a predetermined constant ratio of relative adsorption rate to diverted product gas returned flow rate.

12. Apparatus for continuously separating feed gas mixture by selective adsorption of at least one component at higher pressure and desorption at lower pressure comprising:

a. at least three adsorbent beds with interconnecting conduits and associated valving for consecutive introduction of said feed gas mixture to one end of each bed as the adsorption step at first higher pressure with discharge of one-component depleted product gas from the bed's other end, depressurization to second lower pressure for desorption and at least partial repressurization of the desorbed bed by said product gas followed by recontact with said feed gas mixture;

b. means for sensing the relative adsorption rate in each of the adsorption beds when contacted with said feed gas mixture;

c. conduit means for simultaneously diverting a portion of the product gas discharged from each adsorption bed when contacted with said feed gas mixture and returning at least part of the diverted product gas portion to a desorbed adsorption bed for repressurization thereof;

d. flow control means in product gas diverting conduit c;

e. means for transmitting signals from said relative adsorption rate sensing means b to said flow control means d for adjustment to maintain a predetermined constant ratio of relative adsorption rate to the diverted product gas return flow rate;

f. means for sensing the product gas repressurization pressure between flow control means d and said one end of the adsorbent beds;

g. cycle flow sequencing means associated with said interconnecting conduits and valving a for initiating the step changes among the adsorbent beds; and h. means for transmitting signals from the product gas repressurization pressure sensing means f to cycle flow sequencing means g when the repressurization gas rises to a predetermined value to simultaneously: (1) terminate repressurization of each bed and return same to the adsorption step; and (2) initiate step changes in the other beds.

13. Apparatus according to claim 12 in which the product gas repressurization pressure sensing means f comprises a cell adapted to sense the pressure difference between the repressurization gas and the feed gas mixture, and generate a signal when said pressure drops to a predetermined value.

14. Apparatus according to claim 12 in which said flow control means d comprises a flow restrictor, means for sensing the differential pressure across the flow restrictor, a flow regulator downstream of said flow restrictor, means for converting said differential pressure into a signal, and means for transmitting the signal to said flow regulator for adjustment thereof.

15. Apparatus according to claim 12 in which the relative adsorption rate sensing means b comprises an orifice and means for sensing the differential pressure across the orifice, and the signal transmitting means e includes a linear converter.

16. Apparatus according to claim 12 in which said flow control means d comprises a first orifice, means for sensing the diverted product gas differential pressure across the first orifice, means for converting said differential pressure into a signal, a flow ratio controller adapted to generate a signal representative of the variation from a predetermined ratio of relative adsorption rate to diverted gas return flow rate, means for transmitting the diverted product gas differential pressure signal to said flow ratio controller; and in which the relative adsorption rate sensing means b comprises a second orifice, means for sensing the differential pressure across the second orifice, and means for converting said differential pressure into a signal being transmitted to said flow ratio controller by means e; a regulator in said product gas diverting conduit c downstream of said first orifice, and means for transmitting said signal for said flow ratio controller to said regulator for flow adjustment responsive to variation from the predetermined flow rate ratio.

17. Apparatus according to claim 12 in which said flow control means d comprises an adjustable valve, the signal transmitting means e provides adjustment thereof, and a regulator is provided in product gas diverting conduit c. downstream of said adjustable valve to maintain a constant pre-determined pressure in said conduit c between said adjustable valve and said regulator.

18. Apparatus according to claim 12 in which the product gas repressurization pressure sensing means f comprises a cell adapted to sense the pressure difference between the repressurization gas and the product gas, and generate a signal when said pressure difference drops to a predetermined value.

19. Apparatus according to claim 14 in which said flow restrictor is the variable type, said flow control means d also comprises a purge gas conduit joined at one end of said product gas diverting conduit c between the variable flow restrictor and said flow regulator and joined at the other end to said adsorption beds for intermittent sequential flow of a first part of the diverted product gas thereto for purging, flow control means in said purge gas conduit for maintaining the purge gas flow rate constant during the intermittent flow periods, and a signal modifier in the signal transmitting means to said variable flow restrictor adding a constant incremental value to the signal being representative of the total purge gas flow averaged over the entire cycle time for said adsorption beds.

20. Apparatus for continuously separating feed gas mixture by selective adsorption of at least one component at higher pressure and desorption at lower pressure comprising:

a at least three adsorbent beds with interconnecting conduits and associated valving for consecutive introduction of said feed gas mixture to one end of each bed as the adsorption step at first higher pressure with discharge of one-component depleted product gas from the bed's other end, depressurization to second lower pressure for desorption and at least partial repressurization of the desorbed bed by said product gas followed by recontact with said feed gas mixture;

b. means for sensing the mass transfer adsorption front in each of the adsorption beds when contacted with said feed gas mixture, and means for transmitting signals from said sensing;

c. conduit means for simultaneously diverting a portion of the product gas discharged from each adsorption bed when contacted with said feed gas mixture and returning at least part of the diverted product gas portion to a desorbed adsorption bed for repressurization thereof;

d. flow control means in product gas diverting conduit c;

e. means for sensing the product gas repressurization pressure between flow control means d and said one end of the adsorption beds, and means for transmitting signals from said sensing;

f. means for comprising the transmitted signals from the mass transfer adsorption front b and from the product gas repressurization pressure e, and generating a comparison signal;

g. means for transmitting said comparison signal from f to said flow control means d for adjustment to maintain a predetermined constant ratio of relative adsorption rate to the diverted product gas return flow rate;

h. cycle flow sequencing means associated with said interconnecting conduits and valving a for initiating the step changes among the adsorbent beds; and i. means for transmitting signals from the mass transfer adsorption front sensing means b to cycle flow sequencing means h when the gas purity reaches a predeter-mined value to simultaneously: (1) terminate repressurization of each bed and return same to the adsorption step, and (2) initiate step changes in the other beds.

21. Apparatus for continuously separating feed gas mixture by selective adsorption of at least one component at higher pressure and desorption at lower pressure comprising:

a. four adsorbent beds having void space between adjacent adsorbent particles with interconnecting conduits and associated valving for sequential introduction of said feed gas mixture to one end of a first bed as the adsorption step at first higher pressure with discharge of one-component depleted product gas from the bed's other end, pressure equalization to second previously desorbed bed initially at lower pressure by flowing void space gas thereto, cocurrent depressurization to third lower-than-intermediate pressure by flowing additional void space gas from said first bed through a third bed as purge gas, countercurrent depressurization to a lowest pressure for partial desorption and partial removal of said one component, countercurrent purging by cocurrent depressurization gas from a fourth bed at said lowest pressure for desorption and removal of the remaining one component, and countercurrent repressurization of the desorbed first bed to a higher pressure by introduction of void space gas from said second adsorbent bed and product gas from a third adsorbent bed such that the last part of repressurization is performed with only said product gas, followed by recontact of said feed gas mixture with the fourth, second and third beds successively following the first bed in the adsorption and succeeding cycle step sequence;

b. means for sensing the feed gas load rate to the first adsorbent bed during the selective adsorption step;

c. conduit means for simultaneously diverting a portion of said product gas from said first adsorbent bed and returning the diverted product gas to the desorbed fourth adsorbent bed for repressurization thereof;

d. flow control means in product gas diverting conduit c;

e. means for transmitting signals from the feed gas load rate sensing means (b) to said flow control means (d) for adjustment to maintain a predetermined constant ratio of feed gas load rate to the diverted product gas return rate;

f. means for sensing the product gas repressurization pressure between flow control means d and one end of the bed being countercurrently repressurized;

g. cycle flow sequencing means associated with said interconnecting conduits and valving a for initiating the step changes among the adsorbent beds; and h. means for transmitting signals from the product gas repressurization pressure sensing means f to cycle flow sequencing means g when the repressurization gas rises to a predetermined value to simultaneously (1) terminate repressurization of each bed and return same to the adsorption step, and (2) initiate step changes in the other beds.

* * * * *

UNITED STATES PATENT OFFICE
CERTIFICATE OF CORRECTION

Patent No. 3,703,068      Issue Date November 21, 1972

Inventor(s) John L. Wagner

It is certified that error appears in the above-identified patent and that said Letters Patent are hereby corrected as shown below:

Claim 1, line 7, delete "of" and substitute --by--.

Claim 16, line 63, delete "for" and substitute --from--.

Signed and sealed this 13th day of March 1973.

(SEAL)
Attest:

EDWARD M. FLETCHER, JR.
Attesting Officer

ROBERT GOTTSCHALK
Commissioner of Patents